No. 659,673. Patented Oct. 16, 1900.
E. W. HOLT.
AIR ADMISSION AND CHECK VALVE FOR PNEUMATIC TIRES.
(Application filed June 8, 1900.)
(No Model.)
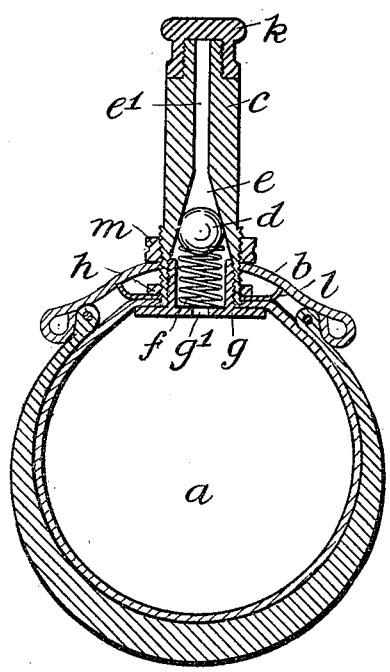
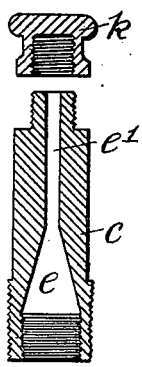
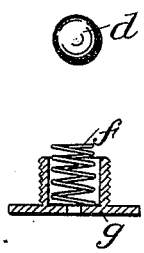
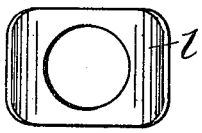
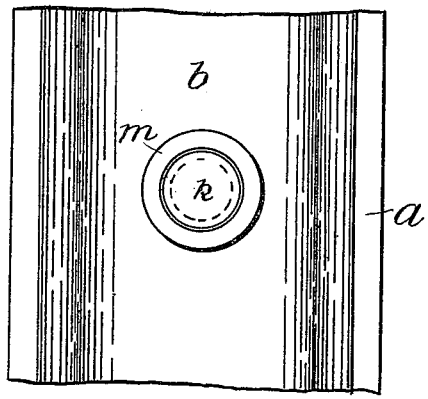
WITNESSES:
Ella L. Giles
Otto Munk
INVENTOR
Edward William Holt
BY
Richards
ATTORNEYS

UNITED STATES PATENT OFFICE.

EDWARD WILLIAM HOLT, OF LONDON, ENGLAND.

AIR ADMISSION AND CHECK VALVE FOR PNEUMATIC TIRES.

SPECIFICATION forming part of Letters Patent No. 659,673, dated October 16, 1900.

Application filed June 8, 1900. Serial No. 19,599. (No model.)

*To all whom it may concern:*

Be it known that I, EDWARD WILLIAM HOLT, a subject of the Queen of Great Britain and Ireland, residing at Tottenham, London, England, have invented a new and Improved Air Admission and Check Valve for Pneumatic Tires, (for which I have made application for Letters Patent in Great Britain under No. 9,066, bearing date May 16, 1900,) of which the following is a specification.

This invention consists in an improved form of air admission and check valve as applied to the supporting-rim and inner inflating-tube of a pneumatic tire and is so designed as to be cheap of manufacture and capable of being lifted from the outside by a wire or a hair-pin to allow issue of excess of air from the tube without removal of the valve or the valve-casing.

Figure 1 is a transverse section through my valve adapted to a pneumatic bicycle-tire. Fig. 2 is a plan of the same. Fig. 3 shows details of the valve taken apart.

$a$ is a pneumatic tire and cover mounted in any known manner in a rim $b$.

$c$ is the valve-casing, and $d$ is a ball-valve, of rubber, metal composition, or any suitable material. The ball-valve $d$ makes its seating on the walls of a long cone $e$ in the body of the casing and is normally held up to such seating by a light spiral spring $f$ behind it. The spring $f$ is held in a screwed cover $g$, which closes the bottom of the casing $c$ and forms an under flange, on which the inflating-tube is gripped by a nut $h$. The cover $g$ has a central hole $g'$ for the passage of the air into and out of the inflating-tube. The narrow end of the cone-seating $e$ terminates in a narrow entry-tube $e'$ for the admission of the air by a pump of any suitable description which is screwed onto the end of the casing $c$. When the inflation is finished, a screwed dust-cap $k$ is fixed onto the end of the casing $c$.

The spring-recoil of the ball-valve $d$ insures the prompt closing of the air-passage after each forcing-stroke of the pump.

A disk flange or washer $l$ is used at the back of the inflating-tube to hold it up a convenient distance from the rim $b$.

The valve-casing $c$ is secured to the rim $b$ by a nut $m$ on the outer screwed shell of the casing $c$.

Should the tube when inflated be found to contain excess pressure of air by expansion or otherwise, the pressure may be relieved by inserting a wire or hair-pin through the entry-passage $e'$. After removal only of the dust-cap $k$ the valve $d$ may be thus lifted from its seat and any excess of internal pressure in the inflation-tube be allowed to escape.

Having now particularly described my invention, what I claim, and desire to secure by Letters Patent, is—

In combination with the inflation-tube and rim of a pneumatic tire a valve-casing, having a central passage and long conical chamber therein, a ball-valve in said conical chamber; a flanged recessed cover, having a central hole screwed into the base of said conical chamber; a spiral spring in the recess of said cover, pressing the valve into said coned chamber; a dust-cap closing central passage; and means for attachment of valve-casing both to tire-inflation tube, and to the metal rim, substantially as described.

In witness whereof I have hereunto set my hand in presence of two witnesses.

EDWARD WILLIAM HOLT.

Witnesses:
RICHARD A. HOFFMANN,
CHARLES CARTER.